United States Patent [19]

Moden et al.

[11] Patent Number: 5,296,313
[45] Date of Patent: Mar. 22, 1994

[54] LOW DISCHARGE RATE ALKALINE BATTERY

[75] Inventors: James R. Moden, Bristol; Zoe Adamedes, Providence, both of R.I.

[73] Assignee: The United States of America as represented by the Secretary of the Navy, Washington, D.C.

[21] Appl. No.: 17,918

[22] Filed: Feb. 16, 1993

[51] Int. Cl.⁵ .......................................... H01M 12/04
[52] U.S. Cl. .................................... 429/50; 424/120; 424/219; 424/105
[58] Field of Search ................. 429/50, 206, 219, 120, 429/70, 105

[56] References Cited

U.S. PATENT DOCUMENTS

| | | | |
|---|---|---|---|
| 4,041,219 | 8/1977 | Nishimura et al. | 429/219 X |
| 4,405,698 | 9/1983 | Nagaura | 429/219 |
| 4,520,087 | 5/1985 | Kamata et al. | 429/219 |
| 5,166,011 | 11/1992 | Rao et al. | 429/219 |

Primary Examiner—Stephen Kalafut
Attorney, Agent, or Firm—Michael J. McGowan; Prithvi C. Lall; Michael F. Oglo

[57] ABSTRACT

A battery is provided comprising an aluminum anode, an alkali aqueous solution of controlled concentration and temperature and a second electrode operates with high anode efficiency.

10 Claims, 1 Drawing Sheet

LOW DISCHARGE RATE ALKALINE BATTERY

STATEMENT OF GOVERNMENT INTEREST

The invention described herein may be manufactured and used for the Government of the United States of America for governmental purposes without the payment of any royalties thereon or therefor.

BACKGROUND OF THE INVENTION (1) Field of the Invention

This invention relates to an aluminum based battery and more particularly to an aluminum based battery having a controlled concentration of alkaline electrolyte wherein discharge rate is low and the anode efficiency is high. Presently, a high power density primary battery based on aluminum and silver oxide alkaline half cells provide sufficient energy for vehicle propulsion. The major advantage of this electrochemical system is the extraordinary current densities, on the order of 1600 mA/cm, which are readily achieved. These high current densities are indicative of facile electron transfer in both the anodic and the cathodic redox couples. The high densities in the alkaline aluminum/silver oxide cathodic couple may be attributed to the anomalous solid phase mobility of $Ag^+$. Unlike other cations, the silver cation travels rapidly not only through the liquid phase but also through the solid phase of its salts. Therefore, as AgO is reduced, $Ag^+$ can continually travel to the electrode interface, preventing surface passivation and permitting continuous facile electron transfer.

(2) Description of the Prior Art

Prior to the present invention, it had been demonstrated that the aluminum-silver oxide battery was capable of operating with aluminum efficiencies above 90 percent during discharge at current densities in the range of 500 to above 1500 milliamps per square centimeter using sodium or potassium hydroxide electrolytes at above 70° C. and at concentrations above 4 molar. However, under those same operating conditions, aluminum efficiencies drop to less than 50 percent when the current density was lowered into the range of 30 milliamps per square centimeter. Certain underwater vehicles require high energy density batteries capable of operating at very low to very high drain rates (30 to 1500 milliamps per square centimeter). The aluminum and silver oxide battery system would be a useful energy source for such vehicles only if its energy density at low rates could be improved. The corollary requirement was that it must operate with high aluminum efficiencies (low corrosion rates) at low current densities, otherwise corrosion of the aluminum produces excessive gas and reduces the energy density by using excessive electrolyte and aluminum.

Examples of aluminum based alkaline batteries are disclosed in U.S. Pat. Nos. 3,953,239; 4,107,406 and 4,150,204.

It would be desirable to provide an aluminum based battery capable of producing high voltages and operating at high efficiencies when functioning at low discharge rates.

SUMMARY OF THE INVENTION

This invention provides a battery which comprises an aluminum anode, an alkali electrolyte of controlled concentration and containing sodium stannate (e.g., 10–20 grams per liter) and a silver oxide cathode. The alkali electrolyte is dissolved in seawater, distilled water or tap water wherein the alkali concentration is between about 1 and 3 molar. The performance of the battery is enhanced by high temperatures, from about 45° to 55° C. and modest electrolyte flow velocities of about 200 to 800 centimeters per minute. When operated at low discharge rates of between about 30 and 100 milliamps per centimeter square ($mA/cm^2$), high cell voltages of between 1.85 and 2.074 volts per cell and high operating efficiencies of 85% or higher are obtained. It has been discovered that these high efficiencies are not obtained at the lower rates (less than about 50 mA) when the alkali concentration in the electrolyte exceeds about 3 molar or when temperatures exceed about 55° C.

BRIEF DESCRIPTION OF THE DRAWINGS

A more complete understanding of the invention and of the attendant advantages thereto will be readily appreciated as the same becomes better understood by references to the following detailed description when considered in conjunction with the accompanying drawings wherein.

DESCRIPTION OF THE PREFERRED EMBODIMENTS

The anode of the battery of this invention can be pure aluminum which is readily available at a purity of at least about 99.99% or an aluminum alloy depending on the electrolyte composition. The battery of this invention is based upon the following electrochemical reactions:

$$ANODE: 2\,Al + 8\,OH^- \rightarrow 2\,AlO_2^- + 4\,H_2O + 6e^- \quad (1)$$

$$CATHODE: 3\,AgO + 3\,H_2O + 6e^- \rightarrow 3\,Ag + 6OH^- \quad (2)$$

$$OVERALL\ BATTERY: 2\,Al + 3\,AgO + 2OH^- \rightarrow 2\,AlO_2^- + 3\,Ag + H_2O \quad (3)$$

The aluminum alloy has composition which permits the electrochemical reaction at the anode to proceed as set forth above by Equation 1. Representative suitable alloys include the aluminum plus magnesium, (0–0.8%), tin (0–0.15%), and gallium (0–0.05%) or the like.

As set forth above, the battery of this invention is operated at an efficiency greater than about 85%. "Efficiency" as used herein is defined as 100 times the amount of aluminum consumed electrochemically divided by the total amount of aluminum consumed electrochemically and by corrosion.

The electrolyte utilized in the battery of this invention comprises an alkali aqueous solution wherein the concentration of alkali is between about 1 and 3 molar preferably between about 1.5 and 2.5 molar. Suitable alkaline compositions which can be utilized include potassium hydroxide or sodium hydroxide. The alkali solution can be formed from distilled water, tap water or seawater.

A second electrode is required to complete the battery circuit and is formed of silver peroxide capable of causing the oxidation of water. Representative suitable materials for forming the second electrode also include silver oxide, hydrogen peroxide, oxygen, nickel oxyhydroxide or the like. Silver peroxide comprises the preferred second electrode.

Figure 1:
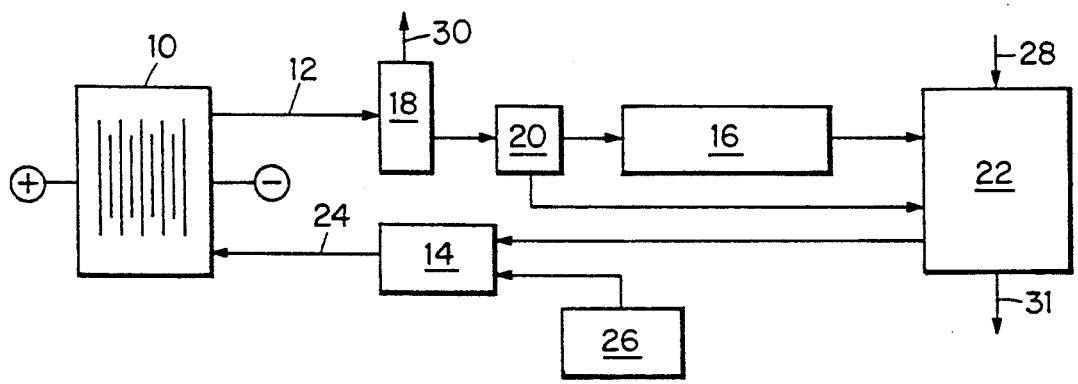
FIG. 1 is a schematic diagram of a system utilizing the battery structure of this invention.

In use, it is preferred to operate the battery of this invention at elevated temperatures on the order of 50° C. The temperature is conveniently controlled by flowing the electrolyte between the battery housing and a heat exchanger by any conventional means. An effective means for operating the battery of this invention is shown in FIG. 1. The battery 10 includes an aluminum anode, the second electrode and an alkali electrolyte having an alkali concentration preferably between about 1.5 and 2.5 molar. The electrolyte is removed from the housing 10 through conduit 12 by means of pump 14 and is cycled to heat exchanger 16 through gas-liquid separator 18 and valve 20. The electrolyte from heat exchanger 16 is returned to battery 10 through electrolyte reservoir 22 and conduit 24. Make-up electrolyte is supplied from tank 26. Hydrogen gas is removed from separator 18 through conduit 30. Make-up seawater is added to reservoir 22 through conduit 28. Waste electrolyte is removed from reservoir 22 through conduit 31.

The following example illustrates the present invention and is not intended to limit the same.

EXAMPLE I

This example illustrates the utility of the aluminum based alkali battery of this invention. The electrolyte utilized in the battery comprised a NaOH aqueous solution containing 20 grams of sodium stannate per liter, a silver peroxide second electrode and a 99.99% aluminum anode alloyed with magnesium, tin, and gallium. Measurements of efficiency and cell voltage were made at varying current densities.

Figure 2:
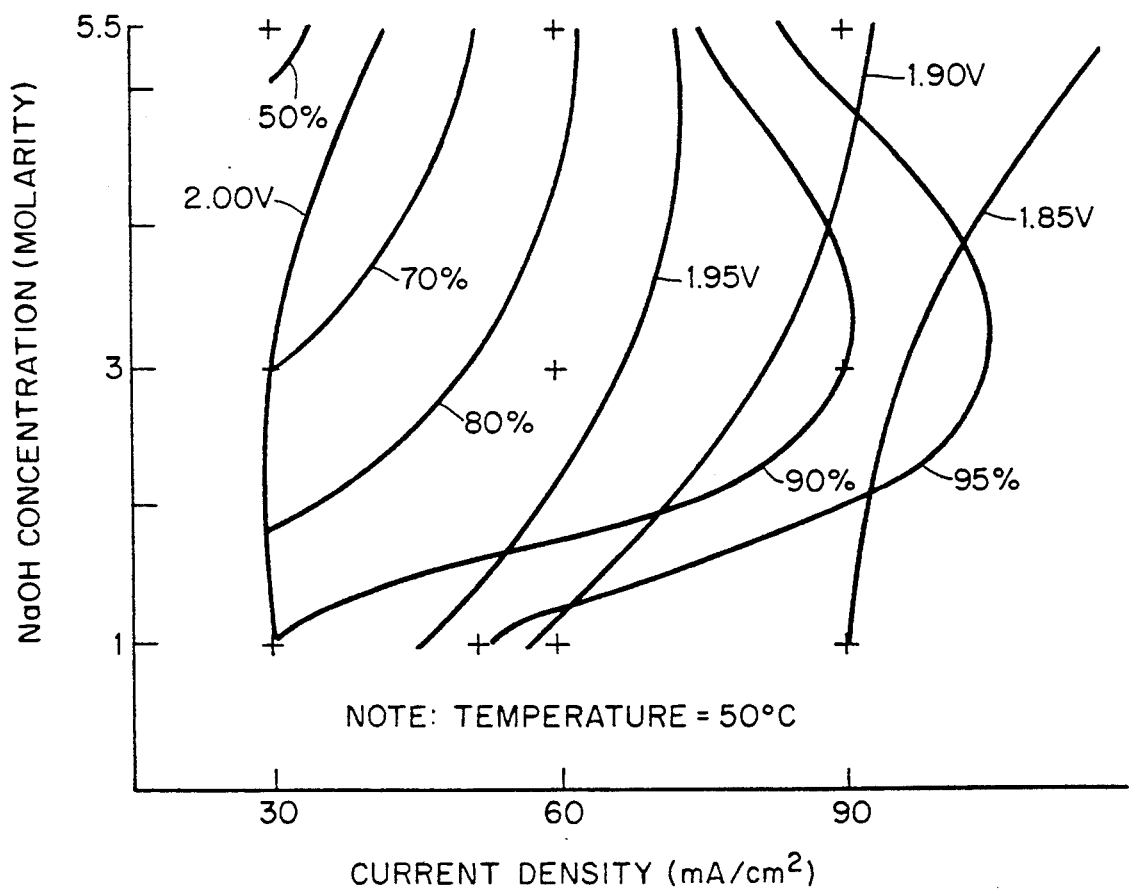
FIG. 2 is a graph of anode operating efficiencies and cell voltages obtained and projected as a function of current density and alkali concentration at 50° C. as described in Example 1.

A graph of measured efficiency and discharge voltage as a function of current density and alkali concentration at 50° C. is shown in FIG. 2. As shown in FIG. 2, higher anode efficiencies are obtained at lower alkali concentrations, especially at current densities below 50 mA/cm$^2$ while obtaining high cell voltages.

A similar cell with all parameters the same except operating with a more concentrated alkali electrolyte, is capable of producing the same high voltage but with anode efficiencies only in the range of 50 to 70%. At current densities above 50 mA/cm$^2$ a wider latitude in the range of temperatures and alkali concentrations provide acceptable efficiencies.

In light of the above, it is therefore understood that within the scope of the appended claims, the invention may be practiced otherwise than as specifically described.

What is claimed is:

1. A battery comprising:
    a housing;
    an aluminum anode within said housing;
    an electrode capable of oxidizing water within said housing;
    a 1 to 3 molar alkali electrolyte solution; and
    a heat exchanger means for controlling the temperature of said electrolyte solution.

2. The battery of claim 1 wherein said electrolyte is sodium hydroxide.

3. The battery of claim 1 wherein said electrode is silver peroxide.

4. The battery of claim 2 wherein said electrode is silver peroxide.

5. The process for producing an electrical current which comprises providing a circuit between the cathode and the anode of the battery of claim 1 and wherein said electrolyte solution is maintained at a temperature between about 45° C. and 55° C.

6. The process of claim 5 wherein said electrode is silver peroxide.

7. The process of claim 5 wherein said electrolyte is sodium hydroxide and said electrode is silver peroxide.

8. The process of claim 5 wherein said alakali electrolyte solution is 1.5 to 2.5 molar.

9. The process of claim 6 wherein said alkali electrolyte solution is 1.5 to 2.5 molar.

10. The process of claim 7 wherein said alkali electrolyte solution is 1.5 to 2.5 molar.

* * * * *